(12) United States Patent
Güllük et al.

(10) Patent No.: US 11,499,602 B2
(45) Date of Patent: Nov. 15, 2022

(54) TORQUE TRANSMITTING DEVICE

(71) Applicant: Schaeffler Technologies AG & Co. KG, Herzogenaurach (DE)

(72) Inventors: Toros Güllük, Lichtenau (DE); Thorsten Krause, Bühl (DE); Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 456 days.

(21) Appl. No.: 16/603,949

(22) PCT Filed: May 15, 2018

(86) PCT No.: PCT/DE2018/100457
§ 371 (c)(1),
(2) Date: Oct. 9, 2019

(87) PCT Pub. No.: WO2018/219395
PCT Pub. Date: Dec. 6, 2018

(65) Prior Publication Data
US 2020/0124132 A1    Apr. 23, 2020

(30) Foreign Application Priority Data

May 31, 2017    (DE) .......................... 102017111930.2

(51) Int. Cl.
*F16F 15/12*    (2006.01)
*F16H 45/02*    (2006.01)
*F16F 15/14*    (2006.01)

(52) U.S. Cl.
CPC ...... *F16F 15/1207* (2013.01); *F16F 15/1203* (2013.01); *F16H 45/02* (2013.01); *F16F 15/145* (2013.01); *F16H 2045/0226* (2013.01)

(58) Field of Classification Search
CPC ... F16F 15/1207; F16F 15/1203; F16H 45/02; F16H 2045/0226
See application file for complete search history.

(56) References Cited

U.S. PATENT DOCUMENTS

| 2011/0099992 A1* | 5/2011 | Magerkurth | F16F 15/145 60/435 |
| 2011/0192692 A1* | 8/2011 | Werner | F16F 15/145 192/3.29 |

(Continued)

FOREIGN PATENT DOCUMENTS

| CN | 102758899 A | * | 10/2012 | ............. F16H 45/02 |
| CN | 102918302 A | * | 2/2013 | ............. F16D 13/38 |

(Continued)

*Primary Examiner* — Vishal R Sahni

(57) ABSTRACT

A torque transmitting device that can be rotatably mounted about an axis of rotation includes a series damper having a first damper unit, a second damper unit and a coupling unit. The first damper unit has a damper output side and the second damper unit has a damper input side. The coupling unit is arranged between the damper output side of the first damper unit and the damper input side of the second damper unit. The coupling unit has a first coupling part and a second coupling part, wherein the first coupling part and the second coupling part are arranged axially offset in relation to one another. The first coupling part connects the damper output side of the first damper unit to the second coupling part. The second coupling part connects the first coupling part to the damper input side of the second damper unit.

20 Claims, 11 Drawing Sheets

(56) References Cited

U.S. PATENT DOCUMENTS

| | | | |
|---|---|---|---|
| 2013/0068580 A1 | 3/2013 | Doegel et al. | |
| 2016/0047435 A1* | 2/2016 | Voegtle | F16D 3/12 |
| | | | 464/66.1 |
| 2016/0178030 A1* | 6/2016 | Dinger | F16H 45/02 |
| | | | 74/574.2 |
| 2016/0377158 A1* | 12/2016 | Dinger | F16H 45/02 |
| | | | 192/3.28 |
| 2017/0108051 A1* | 4/2017 | Lee | F16F 15/145 |
| 2017/0307056 A1* | 10/2017 | Verhoog | F16H 45/02 |
| 2017/0335937 A1* | 11/2017 | Depraete | F16F 15/145 |

FOREIGN PATENT DOCUMENTS

| | | |
|---|---|---|
| CN | 105715741 A | 6/2016 |
| CN | 105889351 A | 8/2016 |
| DE | 102015202319 A1 | 8/2015 |
| DE | 102015200832 A1 | 7/2016 |
| JP | S56-070225 U | 6/1981 |
| JP | 2012077820 A | 4/2012 |
| WO | 2009067987 A1 | 6/2009 |
| WO | 2016150441 A1 | 9/2016 |

\* cited by examiner

TORQUE TRANSMITTING DEVICE

CROSS-REFERENCE TO RELATED APPLICATIONS

This application is the U.S. National Phase of PCT Appln. No. PCT/DE2018/100457 filed May 15, 2018, which claims priority to DE 102017111930.2 filed May 31, 2017, the entire disclosures of which are incorporated by reference herein.

TECHNICAL FIELD

The present disclosure relates to a torque transmitting device.

BACKGROUND

WO 2009/067987 discloses a power transmitting device for power transmission between a driving machine and an output, wherein the power transmitting device has a series damper.

SUMMARY

It is the object of the present disclosure to provide an improved torque transmitting device.

This object is achieved by means of a torque transmitting device as described in the present disclosure. Advantageous embodiments are described in the claims.

It has been recognized that an improved torque transmitting device can be provided if the torque transmitting device is rotatably mounted about an axis of rotation and comprises a series damper having a first damper unit, a second damper unit and a coupling unit, wherein the first damper unit has a damper output side and the second damper unit has a damper input side, wherein the coupling unit is arranged between the damper output side and the damper input side, wherein the coupling unit has a first coupling part and a second coupling part, wherein the first coupling part and the second coupling part are arranged offset axially in relation to one another, wherein the first coupling part connects the damper output side to the second coupling part, wherein the second coupling part connects the first coupling part to the damper input side.

This enables the torque transmitting device to be constructed in a modular manner, thus allowing some of the components of the torque transmitting device to be modified according to the requirement profile of the torque transmitting device without the structural configuration of the other components having to be adapted to the modified components. The adaptation is made by means of the two-part coupling unit.

In another embodiment, the torque transmitting device has an output shaft, wherein the coupling unit has a connecting hub, wherein the connecting hub is rotatably mounted on the output shaft, wherein the connecting hub has an external tooth system on the circumference, wherein the first coupling part has an internal tooth system and the second coupling part has a further internal tooth system, wherein the internal tooth system and the further internal tooth system engage in the external tooth system. It is thereby possible to provide an axial tolerance compensation between the first damper unit and the second damper unit. It is furthermore possible for the coupling parts to be plugged in in the axial direction during the assembly of the torque transmitting device, with the result that an assembly time is particularly short and assembly can be performed in an automated manner.

In another embodiment, the torque transmitting device has a bracing means, wherein the bracing means is arranged between a first component and a second component, preferably between the first coupling part and the second coupling part, wherein the bracing means is designed to brace the first component against the second component, preferably the first coupling part against the second coupling part, preferably in the axial direction and/or in in the circumferential direction. It is thereby possible to achieve a tolerance compensation in the circumferential direction.

It has been recognized that an improved torque transmitting device can be provided if the torque transmitting device can be rotatably mounted about an axis of rotation, wherein the torque transmitting device has a turbine wheel of a hydrodynamic convertor and a series damper having a first damper unit, a second damper unit and a coupling unit, wherein the coupling unit connects the first damper unit torsionally to the second damper unit, wherein the turbine wheel is connected torsionally to the coupling unit.

An effective (rotational) mass of the coupling unit between the first damper unit and the second damper unit is thereby increased, thus making it possible in a simple manner to modify a damper behavior of the torque transmitting device of the series damper.

In another embodiment, the torque transmitting device has at least one speed-adaptive absorber, in particular a centrifugal pendulum, wherein the speed-adaptive absorber has at least one absorber flange, wherein the absorber flange is connected torsionally, preferably positively and/or non-positively, to the coupling unit or is formed integrally and in a materially unitary manner with the coupling unit.

In another embodiment, the absorber flange has an internal tooth system, wherein the absorber flange is arranged axially between the first coupling part and the second coupling part, wherein the internal tooth system engages in the external tooth system and connects the absorber flange torsionally to the connecting hub.

In another embodiment, the speed-adaptive absorber is arranged radially between the first damper unit and the second damper unit, and/or wherein the first damper unit, the second damper unit and the speed-adaptive absorber are preferably arranged in axial overlap. The torque transmitting device can thereby be designed in a particularly compact way.

In another embodiment, the first damper unit has a first damper element having a first stiffness, and the second damper unit has a second damper element having a second stiffness, wherein the bracing means has a third stiffness, wherein the third stiffness is greater than the first stiffness and/or the second stiffness.

In another embodiment, the coupling unit has a further coupling part, wherein the further coupling part is connected on one side to the turbine wheel and on the other side is connected to the first coupling part and/or the second coupling part, wherein the further coupling part is preferably connected by means of a positive connection, in particular a connection that can be plug-fitted in the axial direction, to the first coupling part and/or the second coupling part.

In another embodiment, the torque transmitting device has a further speed-adaptive absorber having, an absorber flange, wherein the further coupling part extends substantially in the axial direction, wherein the further absorber flange extends substantially in a radial direction and is connected radially on the inside or radially on the outside to the further coupling part by means of a connection that can be plug-fitted in the axial direction.

BRIEF DESCRIPTION OF THE DRAWINGS

The present disclosure is explained in greater detail below by means of figures, of which.

DETAILED DESCRIPTION

Figure 1:
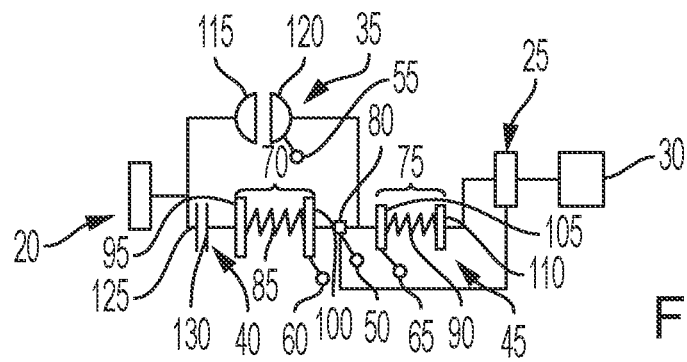
FIG. 1 shows a schematic illustration of a torque transmitting device according to a first embodiment.

FIG. 1 shows a schematic illustration of a torque transmitting device 10 according to a first embodiment. The torque transmitting device 10 has an input side 20 and an output side 25. The input side 20 can be connected torsionally to a drive motor of a drive train of a motor vehicle, for example. The output side 25 can be connected torsionally to a speed increasing device 30, in particular to a vehicle transmission of the motor vehicle, for example. It is also possible for the output side 25 to be connected torsionally to some other component of the drive train. It is also possible for the input side 20 and the output side 25 to be interchanged.

The torque transmitting device 10 furthermore has a hydrodynamic converter 35, a lockup clutch 40, a series damper 45 and a first to fourth speed-adaptive absorber 50, 55, 60, 65.

By way of example, the speed-adaptive absorber 50, 55, 60, 65 is designed as a centrifugal pendulum. Moreover, the speed-adaptive absorber 50, 55, 60, 65 can also be designed in some other way. In particular, it is conceivable for the speed-adaptive absorber 50, 55, 60, 65 to be designed as a trapezoidal centrifugal pendulum or a parallel centrifugal pendulum having one or more absorber weights 220, 235, 245, 255, 325, which are arranged internally or externally. Here, the number of speed-adaptive absorbers 50, 55, 60, 65 in the embodiment is illustrative. It is of course also possible to provide a different number of speed-adaptive absorbers 50, 55, 60, 65. The arrangement of the speed-adaptive absorbers 50, 55, 60, 65 is also illustrative, and a different type can also be selected. It is also possible to dispense with individual or all of the speed-adaptive absorbers 50, 55, 60, 65.

The series damper 45 has at least one first damper unit 70, one second damper unit 75 and a coupling unit 80. The first damper unit 70 has a first damper element 85 and the second damper unit 75 has a second damper element 90. The damper element 85, 90 can be an assembly consisting of one or more springs, in particular compression springs, tension springs and/or are springs. A different configuration of the damper element 85, 90 is also conceivable.

The first damper unit 70 has a first damper input side 95 and a first damper output side 100. The second damper unit 75 has a second damper input side 105 and a second damper output side 110. The first damper element 85 connects the first damper input side 95 to the first damper output side 100. For torque transmission, it is possible here for the first damper input side 95 to rotate relative to the first damper output side 100 around an axis of rotation 15 (shown in FIG. 2) and to compress the first damper element 85 in the circumferential direction, for example.

The coupling unit 80 is arranged between the first damper output side 100 and the second damper input side 105 and preferably connects the first damper output side 100 rigidly to the second damper input side 105. The second damper element 90 connects the second damper input side 105 torsionally to the second damper output side 110. For torque transmission, it is possible here for the second damper input side 105 to rotate relative to the second damper output side 110 around the axis of rotation 15 (shown in FIG. 2) and to compress the second damper element 90 in the circumferential direction, for example. The second damper output side 110 is connected rigidly to the output side 25.

The hydrodynamic converter 35 has a pump impeller 115 and a turbine wheel 120 as well as a converter fluid (not illustrated). The pump impeller 115 is coupled during the operation of the torque transmitting device 10 to the turbine wheel 120 by means of hydrodynamic effects, wherein there is a speed difference between the pump impeller 115 and the turbine wheel 120. The pump impeller 115 is connected torsionally to the input side 20.

The lockup clutch 40 is arranged in parallel with the hydrodynamic converter 35, wherein a clutch input side 125 of the lockup clutch 40 is connected to the input side 20, and a clutch output side 130 of the lockup clutch 40 is connected to the first damper input side 95.

The first speed-adaptive absorber 50 is secured on the coupling unit 80. The coupling unit 80 is furthermore connected torsionally to the turbine wheel 120. A second speed-adaptive absorber 55 is furthermore arranged on the turbine wheel 120. A third speed-adaptive absorber 60 is arranged on the first damper output side 100, and a fourth speed-adaptive absorber 65 is arranged on the second damper input side 105.

When the lockup clutch 40 is closed, i.e. when a clutch input side 125 is connected torsionally to a clutch output side 130 by frictional engagement in the lockup clutch 40, a torque coming, by way of example in the embodiment, from the input side 20 is transmitted via the lockup clutch 40 to the first damper input side 95. The output side 25 provides a countertorque to the torque to be transmitted. The first damper input side 95 braces the first damper element 85 relative to the first damper output side 100. Furthermore, the torque to be transmitted is transmitted to the second damper unit 75 via the coupling unit 80. The second damper input side 105 braces the second damper element 90 relative to the second damper output side 110.

If the torque to be transmitted is nonuniform in terms of rotation, exhibiting torsional vibration for example, the rotational nonuniformity is reduced by a cushioning movement of the damper elements 85, 90. Furthermore, the speed-adaptive absorbers 50, 55, 60, 65 are excited and at least partially absorb the rotational nonuniformity, and therefore a particularly smooth torque is made available at the output side 25.

Figure 2:
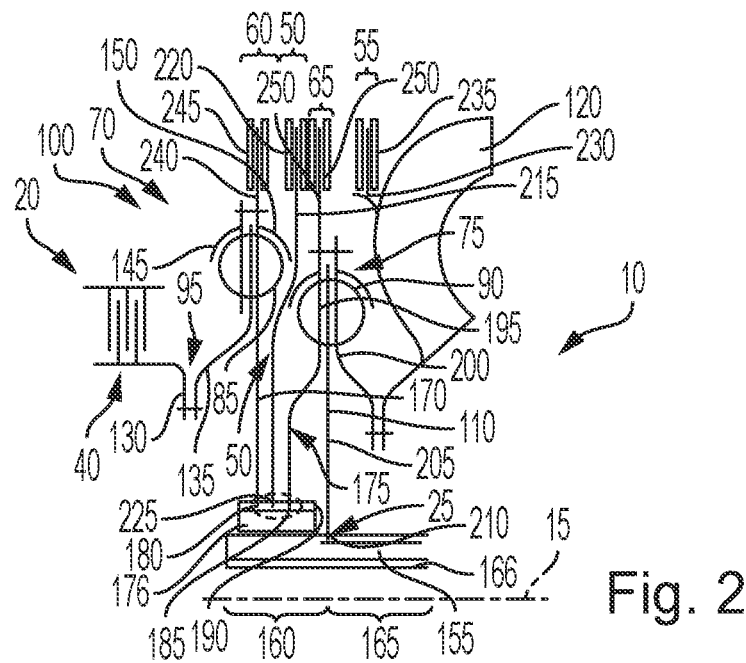
FIG. 2 shows a half longitudinal section through a torque transmitting device according to the embodiment shown in FIG. 1.

FIG. 2 shows a half longitudinal section through the torque transmitting device 10 illustrated schematically in FIG. 1, wherein the pump impeller 115 has not been illustrated.

In this embodiment, by way of example, the lockup clutch 40 is designed as a multiplate clutch. Here, the clutch output side 130 is connected to a first damper input part 135 forming the first damper input side 95.

The first damper input side 95 has a first damper input part 135. The first damper input part 135 is connected radially on the inside to the clutch output side 130. Radially on the outside, the first damper input part 135 is coupled to a first end of the first damper element 85. The first damper output side 100 has a first damper output part 145 and a second damper output part 150. The first damper output part 145 and the second damper output part 150 are arranged axially spaced apart, wherein the first damper input part 135 engages axially between the first damper output part 145 and the second damper output part 150. The first damper output part 145 and the second damper output part 150 are connected to one another, being riveted, screwed or adhesively bonded to one another, for example. The first damper output side 100 is coupled to a second end of the first damper element 85. Furthermore, the first damper output side 100 defines, by way of example, a position of the first damper element 85.

During the transmission of the torque from the input side 20 to the output side 25, the torque from the first damper input part 135 is introduced into the first damper element 85 via the first end and is introduced into the first and second damper output parts 145, 150 via the second end of the first damper element 85.

The output side 25 has an output shaft 155, for example, wherein the output shall 155 can also be designed as a transmission input shaft of the speed increasing device 30. The output shaft 155 has a first section 160 and a second section 165, which, by way of example, is arranged axially adjoining the first section 160 in this embodiment. On the circumference, by way of example, the second section 165 has a first external tooth system 166, whereas the first section 160 has a sliding surface on the outside at the circumference, for example.

The coupling unit 80 has a first coupling part 170, at least one second coupling part 175 and a connecting hub 176. The first coupling part 170 and/or the second coupling part 175 are of disk-shaped design and are connected radially on the outside to the second damper output part 150. It is conceivable here for the first coupling part 170 and the second damper output part 150 to be formed integrally and in a materially unitary manner. The first coupling part 170 has a first internal tooth system 180 and the second coupling part 175 has a second internal tooth system 185. By way of example, the first internal tooth system 180 and the second internal tooth system 185 are of identical design.

The connecting hub 176 is arranged rotatably on the first section 160 of the output shaft 155 radially on the inside. The connecting hub 176 has a second external tooth system 190, wherein the second external tooth system 190 is formed in a manner corresponding to the first internal tooth system 180 and to the second internal tooth system 185. The first internal tooth system 180 and the second internal tooth system 185 engage in the second external tooth system 190. The connecting hub 176 thereby couples the first coupling part 170 to the second coupling part 175. In addition, means that are not illustrated can be provided to define an axial position both of the connecting hub 176 and of the first and/or second coupling part 170, 175.

The first damper unit 70 is arranged axially adjacent to the lockup clutch 40. The second damper unit 75 is arranged axially between the turbine wheel 120 and the first damper unit 70. The second damper input side 105 has a second damper input part 195 and a third damper input part 200, which is arranged spaced apart axially from the second damper input part 195. The second and third damper input part 195, 200 are connected to one another. In this case, the third damper input part 200 is arranged on a side facing away from the first damper unit 70 and is connected radially on the inside to the turbine wheel 120. Radially on the outside, the second coupling part 175 is connected to the second damper input part 195. In this embodiment, by way of example, the second coupling part 175 and the second damper input part 195 are formed integrally and in a materially unitary manner. Of course, the second damper input part 195 and the second coupling part 175 can also be of multipart design, wherein, in relation to the configuration shown in FIG. 2, the second damper input part 195 is attached radially on the inside to a radially outer side of the second coupling part 175 in this configuration. The second and third damper input part 195, 200 are coupled to a first end of the second damper element 90.

Between the second damper input part 195 and the third damper input part 200, the second damper output side 110 has a third damper output part 205. The third damper output part 205 is coupled radially on the outside to a second end of the second damper element 90. Radially on the inside, the third damper output part 205 has a third internal tooth system 210, which corresponds in design to the first external tooth system 166 of the output shaft 155 and engages in the first external tooth system 166.

The first speed-adaptive absorber 50 has a first absorber flange 215 and a first absorber mass 220. In this embodiment, the first speed-adaptive absorber 50 is designed as a centrifugal pendulum situated on the outside, with the result that the first absorber mass 220 is arranged on both sides of the first absorber flange 215. The first speed-adaptive absorber 50 furthermore comprises a guiding device (not illustrated), by means of which the first absorber mass 220 is coupled to the first absorber flange 215, wherein, when the rotational nonuniformity is introduced into the first absorber flange 215, the first absorber mass 220 is guided along a first absorber path by the first guiding device. The first absorber flange 215 is arranged axially between the first and second coupling parts 170, 175 and the damper units 70, 75.

In this embodiment, by way of example, the first absorber flange 215 has a fourth internal tooth system 225. The fourth internal tooth system 225 is of corresponding design to the second external tooth system 190 and engages in the second external tooth system 190 of the connecting hub 176, with the result that the first absorber flange 215 is coupled torsionally to the connecting hub 176 and thus also to the first coupling part 170 and the second coupling part 185. The first absorber mass 220 is arranged radially on the outside with respect to the first damper unit 70 and the second damper unit 75.

The second speed-adaptive absorber 55 has a second absorber flange 230 and a second absorber mass 235, wherein the second absorber mass 235 is coupled by means of a second guiding device (not illustrated) to the second absorber flange 230 and is guided along a second absorber path by the second guiding device when rotational nonuniformities are introduced into the second absorber flange 230 in order to absorb the rotational nonuniformity. Radially on the inside, the second absorber flange 230 is connected to the turbine wheel 120. In this case, the second absorber flange 230 is arranged axially between the turbine wheel 120 and the second damper unit 75.

The third speed-adaptive absorber 60 is arranged axially on a side facing the lockup clutch 40 and is arranged in axial overlap with the first damper unit 70. The third speed-adaptive absorber 60 is arranged radially on the outside of the first damper unit 70 and is of similar design to the first speed-adaptive absorber 50 and has a third absorber flange 240 and a third absorber mass 245, which is coupled to the third absorber flange 240 by means of a third guiding device (not illustrated) and leads along a third absorber path when rotational nonuniformities are introduced into the third absorber flange 240. In this embodiment, by way of example, the third absorber flange 240 is connected radially on the inside to the second damper output part 150. In this embodiment, by way of example, the second damper output part 150, the first coupling part 170 and the third absorber flange 240 are formed integrally and in a materially unitary manner and are of disk-shaped design, for example. Of course, some other configuration is also conceivable.

The fourth speed-adaptive absorber 65 is arranged axially between the first and second speed-adaptive absorbers 50, 55 and radially on the outside with respect to the series damper 45 and has a fourth absorber flange 250 and a fourth absorber mass 255. The fourth absorber mass 255 is coupled to the fourth absorber flange 250 by means of a fourth guiding device (not illustrated). When rotational nonuniformities are introduced into the fourth absorber flange 250, the fourth absorber mass 255 is guided along a fourth absorber path by the fourth guiding device and, in the process, at least partially absorbs a rotational nonuniformity. In this embodiment, the fourth absorber flange 250 is connected radially on the inside to the second damper input part 195. It is also conceivable, by way of example, as shown in FIG. 2, for the second coupling part 175, the second damper input part 195 and the fourth absorber flange 250 to be formed integrally and in a materially unitary manner, being of disk-shaped design as shown by way of example in FIG. 2. In this embodiment, all the speed-adaptive absorbers 50, 55, 60, 65 are arranged radially on the outside in relation to the first damper unit 70 and the second damper unit 75 and on the same radial level. Of course, some other arrangement of the speed-adaptive absorber 50, 55, 60, 65 is also conceivable.

When the torque is introduced from the input side 20 toward the output side 25, the first damper element 85 is braced in the circumferential direction by the first damper input part 135 and the first and second damper output parts 145, 150 and, in this way, the torque is transmitted between the first damper input side 95 and the first damper output side 100. The torque is then transmitted from the second damper output part 150 to the first coupling part 170, which, for its part, introduces the torque into the connecting hub 176 via the first internal tooth system 180. The rotational nonuniformities are also transmitted via the connecting flange 176 to the first absorber flange 215, which is not in the direct torque flow. The torque is introduced into the second coupling part 175 past the first absorber flange 215. The second coupling part 175 transmits the torque onward into the second damper input part 195, which, together with the third damper input part 200, braces the second damper element 90 in the circumferential direction. By virtue of the bracing, the second damper element 90 transfers the torque to the third damper output part 205, which, for its part, introduces the torque into the output shaft 155 via the third internal tooth system 210.

The coupling of the turbine wheel 120 to the coupling unit 80 furthermore ensures that, when the lockup clutch 40 is open, rotational nonuniformities are absorbed by the speed-adaptive absorbers 50, 55, 60, 65 and the second damper unit 75 since the torque is introduced by the turbine wheel 120, via the third damper input part 200, into the second damper input part 195 and by the third damper input part 200 and the second damper input part 195 into the second damper element 90, which is braced by the torque with respect to the countertorque applied to the output shaft 155. The torque is introduced from the second damper element 90, via the third damper output part 205 and the third internal tooth system 210, into the output shaft 155 in the second section 165. The attachment of the turbine wheel 120 to the coupling unit 80 increases the effective mass on the input side of the second damper-unit 75, with the result that the torque transmitting device 10 has both a low total weight and a favorable absorption behavior.

Figure 3:
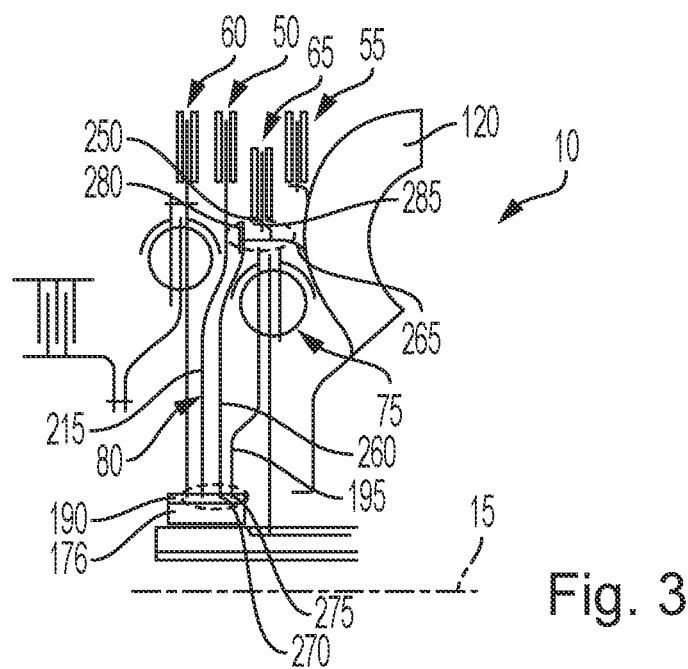
FIGS. 3-23 each show a half longitudinal section through a torque transmitting device according to a second to twenty-second embodiment.

FIG. 3 shows a half longitudinal section through a torque transmitting device 10 according to a second embodiment. The torque transmitting device 10 is of substantially identical design to the torque transmitting device 10 shown in FIGS. 1 and 2. As a departure therefrom, the coupling unit 80 additionally has a third coupling part 260 and a fourth coupling part 265. The third coupling part 260 has a fifth internal tooth system 270, which corresponds in design to the second external tooth system 190 of the connecting hub 176. The fifth internal tooth system 270 engages in the second external tooth system 190, with the result that the third coupling part 260 is connected torsionally to the connecting hub 176. The third coupling part 260 is arranged axially between the first absorber flange 215 and the second damper input part 195 and is of disk-shaped design.

Radially on the outside, the third coupling part 260 is connected to the fourth coupling part 265 by a first plug connection 280. The first plug connection 280 can be released by an axial movement, thus enabling the fourth coupling part 265 to be separated from the third coupling part 260 in a simple manner and reinstalled in an axial plug-action movement. For this purpose, it is possible, for example, for the fourth coupling part 265 to have finger sections which extend in the axial direction and which engage in respective correspondingly provided receptacles radially on the outside of the third coupling part 260 and thus connect the third coupling part 260 torsionally to the fourth coupling part 265. In this embodiment, by way of example, the third coupling part 260 is of disk-shaped design, whereas the fourth coupling part 265 extends substantially in the axial direction and can be of ring-shaped design, for example. Furthermore, the fourth coupling part 265 is arranged radially on the outside with respect to the second damper unit 75 and radially on the inside with respect to the speed-adaptive absorbers 50, 55, 60, 65. The fourth coupling part 265 is attached to the turbine wheel 120 axially on the rear side with respect to the first plug connection 280. In this embodiment, the fourth coupling part 265 is furthermore additionally connected to the fourth absorber flange 250 of the fourth speed-adaptive absorber 65 by means of a second plug connection 285. The second plug connection 285 is designed in such a way that it can be connected or released in the axial direction. As a result, it is possible during assembly, e.g. when inserting the turbine wheel 120 into the torque transmitting device 10, to ensure both a torsional connection between the third coupling part 260 and the fourth coupling part 265 and between the fourth coupling part 265 and the fourth absorber flange 250 in a simple manner.

For example, the second plug connection 285 can be formed by tabs of the fourth coupling part 265, which extend in the axial direction in some section or sections and engage in corresponding recesses provided in the fourth absorber flange 250.

Figure 4:
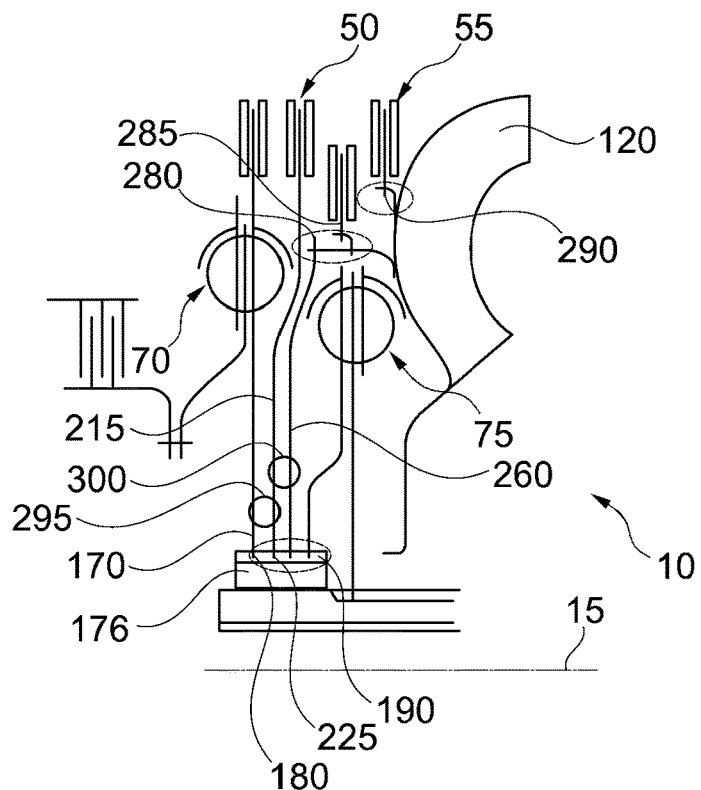

FIG. 4 shows a half longitudinal section through a torque transmitting device 10 according to a third embodiment. The torque transmitting device 10 is of substantially identical design to the configuration shown in FIG. 3. As a departure therefrom, the second speed-adaptive absorber 55 is connected to the turbine wheel 120 by means of a third plug connection 290, which can be connected and released in the axial direction. In this case, the third plug connection 290 can be of substantially identical design to the first and second plug connections 280, 285 illustrated in FIG. 3.

In addition to the second embodiment shown in FIG. 3, the torque transmitting device 10 comprises a first bracing means 295 and a second bracing means 300. Here, the first bracing means 295 is arranged between the first coupling part 170 and the first absorber flange 215 in the circumferential direction and braces the first absorber flange 215 relative to the first coupling part 170 in the circumferential direction. This ensures that tooth system rattle is avoided when the first internal tooth system 180 and the fourth internal tooth system 225 engage on the second external tooth system 190.

The second bracing means 300 braces the third coupling part 260 relative to the first absorber flange 215. In this embodiment, by way of example, the second bracing means 300 is arranged radially on the outside with respect to the first bracing means 295 and radially on the inside with respect to the damper units 70, 75. The first and second bracing means 295, 300 can be an arc spring extending in the circumferential direction or a compression spring arranged tangentially with respect to an orbit around the axis of rotation 15, for example.

Figure 5:
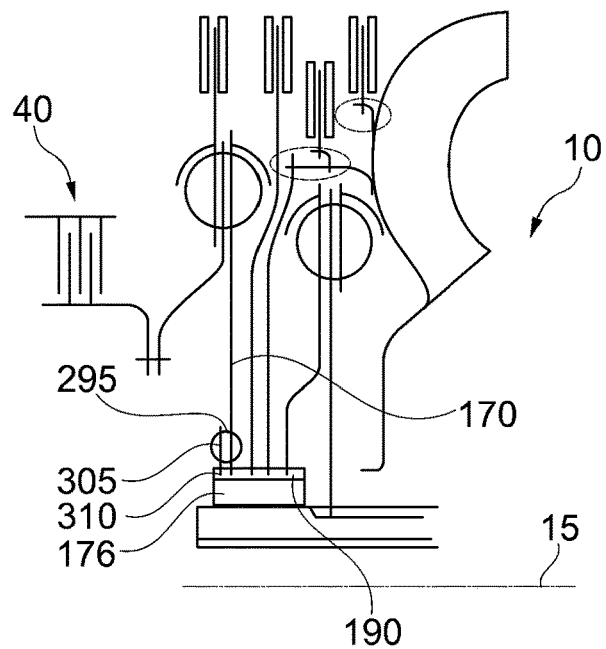

FIG. 5 shows a half longitudinal section through a torque transmitting device 10 according to a fourth embodiment. The torque transmitting device 10 is of substantially identical design to the configuration shown in FIGS. 1 to 4, in particular to the configuration shown in FIG. 4. As a departure therefrom, the second bracing means 300 shown in FIG. 4 is dispensed with. In addition, the coupling unit 80 has a supporting element 305, which has a seventh internal tooth system 310, which engages in the second external tooth system 190. The supporting element 305 extends in a radial direction and is of substantially disk-shaped design. The first bracing means 295 is arranged between the supporting element 305 and the first coupling part 170 and braces the first coupling part 170 relative to the supporting element 305 in the circumferential direction. The supporting element 305 is arranged furthest out in the axial direction on the side of the connecting hub 176 which faces the lockup clutch 40.

Figure 6:
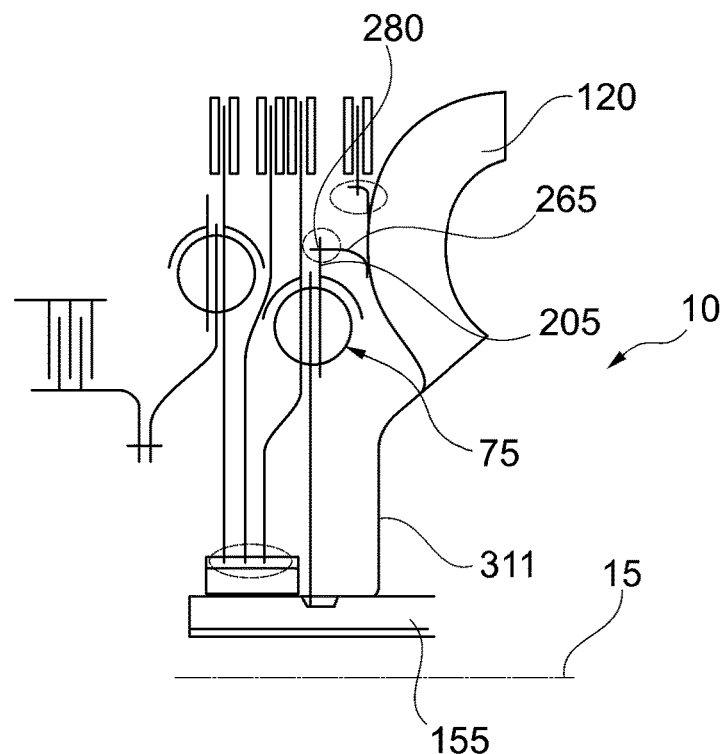

FIG. 6 shows a half longitudinal section through a torque transmitting device 10 according to a fifth embodiment. The torque transmitting device 10 is substantially a combination of the configuration shown in FIG. 2 and the configuration of the torque transmitting device 10 shown in FIGS. 4 and 5. As a departure therefrom, the second plug connection 285 and the third coupling part 260 are dispensed with. The fourth coupling part 265 is connected to the third damper output part 205 by means of the first plug connection 280. In this embodiment, by way of example, the first plug connection 280 is arranged radially on the outside with respect to the second damper unit 75. Moreover, the turbine wheel 120 is mounted rotatably on the output shaft 155 by means of a turbine flange 311. The turbine flange 311 is arranged radially on the inside on the turbine wheel 120.

Figure 7:
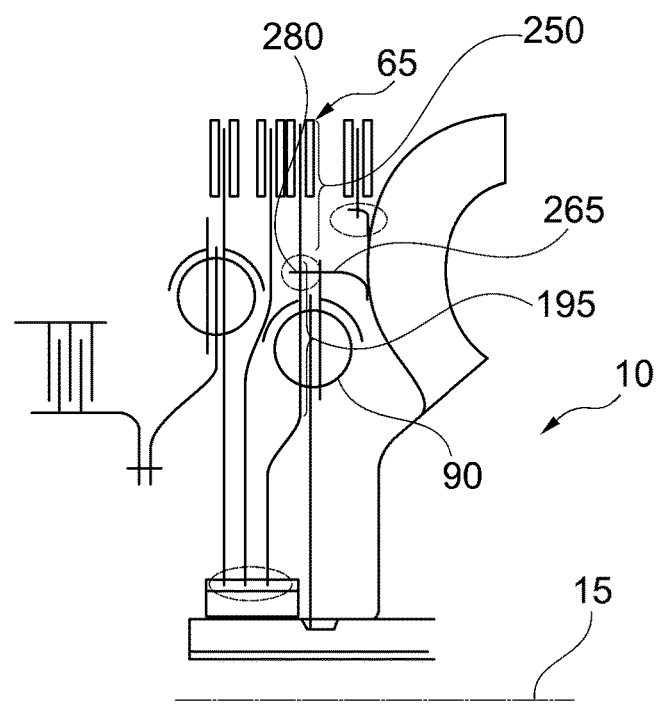

FIG. 7 shows a half longitudinal section through a torque transmitting device 10 according to a sixth embodiment. The torque transmitting device 10 is of substantially identical design to the torque transmitting device 10 shown in FIG. 6. As a departure therefrom, the first plug connection 280 is formed between the fourth coupling part 265 and the second damper input part 195, with the result that the fourth coupling part 265 engages in the second damper input part 195 radially on the outside with respect to the second damper element 90. In the case of the integral and materially unitary configuration of the fourth absorber flange 250 with the second damper input part 195, the fourth coupling part 265 can also engage in the fourth absorber flange 250.

Figure 8:
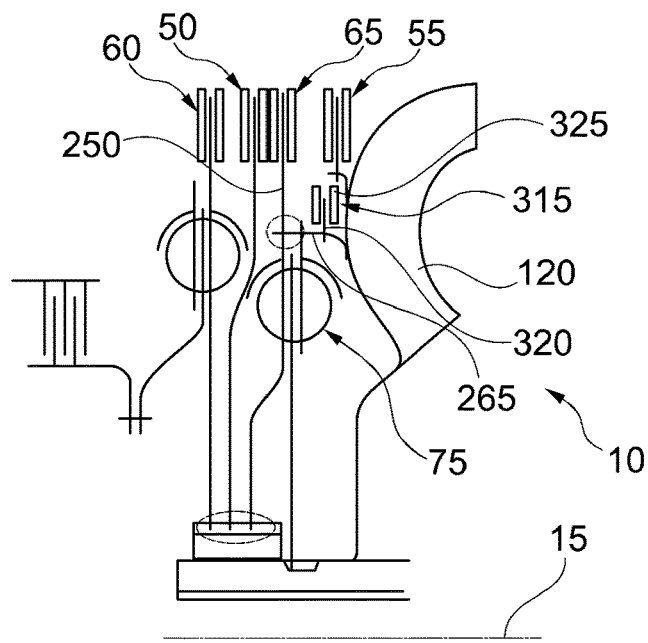

FIG. 8 shows a half longitudinal section through a torque transmitting device 10 according to a seventh embodiment. The torque transmitting device 10 is of substantially identical design to the torque transmitting device 10 illustrated in FIG. 7. As a departure therefrom, the torque transmitting device 10 has a fifth speed-adaptive absorber 315. The fifth speed-adaptive absorber 315 has a fifth absorber flange 320 and at least one fifth absorber mass 325. The fifth absorber mass 325 is connected to the fifth absorber flange 320 by means of a fifth guiding device (not illustrated). When rotational nonuniformities are introduced into the fifth absorber flange 320, the fifth absorber mass 325 is guided along a fifth absorber path by the fifth guiding device. By virtue of the pendulum motion along the fifth absorber path, the fifth absorber mass 325 at least partially absorbs the rotational nonuniformity. The fifth absorber flange 320 extends in the radial direction and is connected radially on the inside to the fourth coupling part 265. In this case, the fifth speed-adaptive absorber 315 is arranged in a radial direction between the second damper unit 75 and the first to fourth speed-adaptive absorber 50, 55, 60, 65. In the axial direction, the fifth speed-adaptive absorber 315 is arranged between the turbine wheel 120 and the fourth absorber flange 250.

Figure 9:
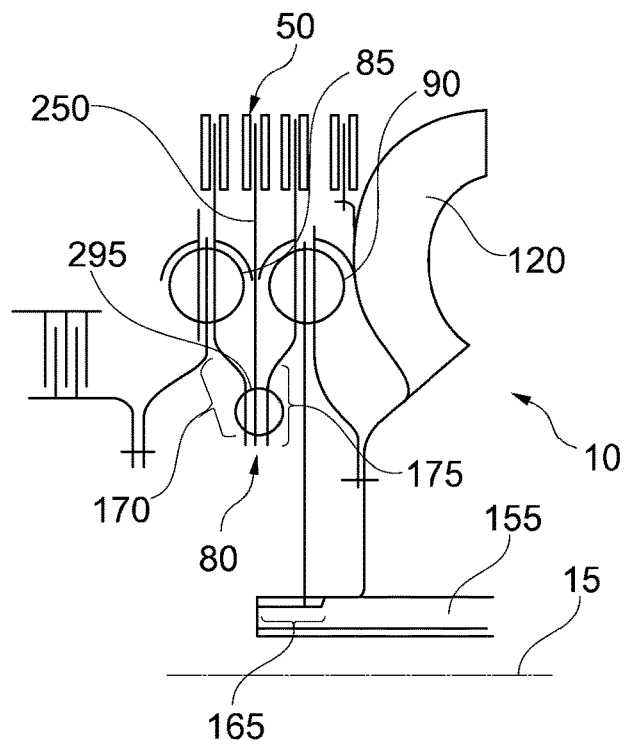

FIG. 9 shows a half longitudinal section through a torque transmitting device 10 according to an eighth embodiment. The torque transmitting device 10 is substantially a combination of the torque transmitting devices 10 illustrated in FIGS. 2 and 6. As a departure therefrom, the connecting hub 176 is dispensed with. Moreover, dispensing with the connecting hub 176 also makes it possible to dispense with the first section 160 of the output shaft 155. As a result, the second section 165 on the output shaft 155 directly adjoins a region on which the turbine wheel 120 is mounted on the output shaft 155 in such a way as to be rotatable relative to the output shaft 155.

Moreover, the first coupling part 170 and the second coupling part 175 are shortened in a radially inward direction, with the result that, radially on the inside, the first coupling part 170 and the second coupling part 175 are arranged spaced apart from the output shaft 155. In addition, the first bracing means 295 is provided, wherein the first bracing means 295 braces the first coupling part 170 relative to the second coupling part 175. In addition, the fourth absorber flange 250 can engage in the first bracing means 295.

The first damper element 85 has a first stiffness. The second damper element 90 has a second stiffness. The first bracing means 295 has a third stiffness, wherein the third stiffness is greater than the first stiffness and/or the second stiffness. It is particularly advantageous if the third stiffness is at least twice, preferably five times, the first stiffness and/or the second stiffness. However, the third stiffness should at least be smaller than one hundred times the first stiffness and/or the second stiffness.

Figure 10:
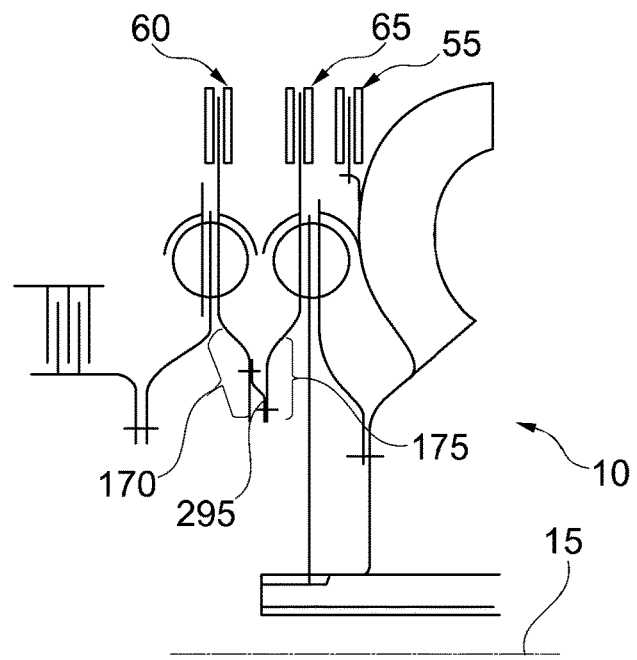

FIG. 10 shows a half longitudinal section through a torque transmitting device 10 according to a ninth embodiment. The torque transmitting device 10 is of substantially identical design to the torque transmitting device 10 shown in FIG. 9. As a departure therefrom, the first speed-adaptive absorber 50 is dispensed with. Moreover, the first bracing means 295 comprises a diaphragm spring or a leaf spring, which connects the first coupling part 170 torsionally to the second coupling part 175 in a manner which is particularly stiff in the circumferential direction. As a result, a configuration of the first bracing means 295 which is particularly stiff but simultaneously (softly) sprung in the circumferential direction is ensured.

Figure 11:
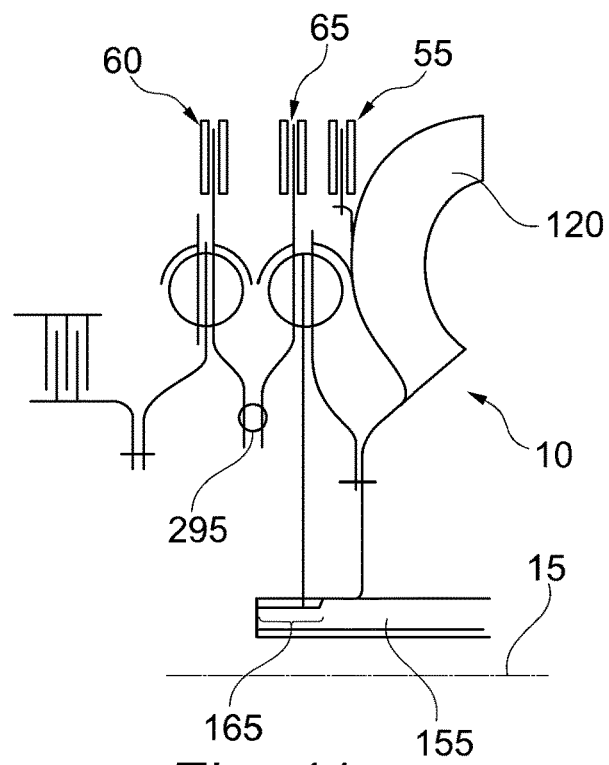

FIG. 11 shows a half longitudinal section through a torque transmitting device 10 according to a tenth embodiment. The torque transmitting device 10 is substantially a combination of the torque transmitting devices 10 shown in FIGS. 9 and 10. Here, as illustrated in FIG. 9, the first bracing means 295 is designed as an arc spring or compression spring and braces the first coupling part 170 to the second coupling part 175 in the circumferential direction and has the third stiffness illustrated in FIGS. 9 and 10.

Figure 12:
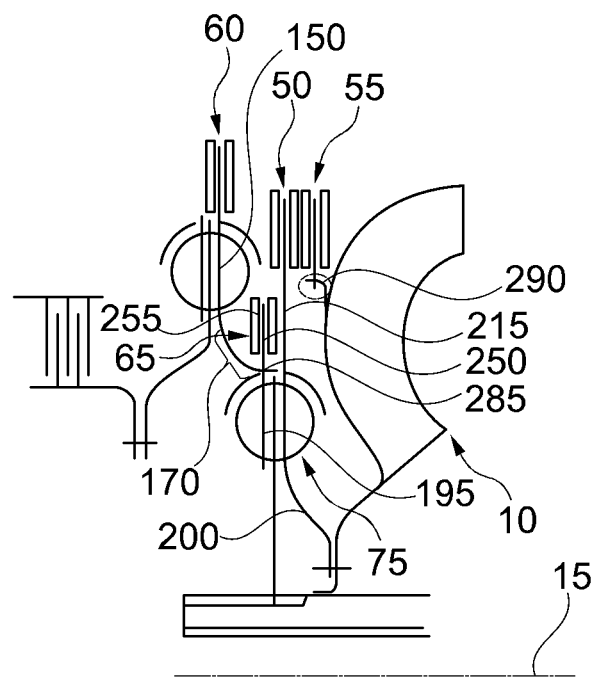

FIG. 12 shows a half longitudinal section through a torque transmitting device 10 according to an eleventh embodiment. The torque transmitting device 10 is of substantially identical design to the configurations shown in FIGS. 9 to 11.

As a departure therefrom, the second coupling part 175 is dispensed with. The first coupling part 170 is of arc-shaped design in relation to the half longitudinal section shown in FIG. 11. At one end of the first coupling part 170, which is arranged on a side facing away from the second damper output part 150, the first coupling part 170 is connected torsionally to the second damper input part 195 or the fourth absorber flange 250 by means of the second plug connection 285. In this case, the first coupling part 170 engages in the fourth absorber flange 250 or the second damper input part 195 at the free end, with the result that the assembly direction and/or the disassembly direction of the torque transmitting device 10 in the axial direction is ensured.

In FIG. 12, the second plug connection 285 is arranged radially on the outside of the second damper unit 75, between the fourth absorber mass 255 and the second damper unit 75. In this embodiment, by way of example, the fourth speed-adaptive absorber 65 is furthermore arranged radially on the inside with respect to the first speed-adaptive absorber 50. Moreover, by way of example, the first absorber flange 215 is integral and materially unitary with the third damper input part 200 and is arranged radially on the outside of the third damper input part 200. Of course, the third damper input part 200 and the first absorber flange 215 can also be of multipart design.

Figure 13:
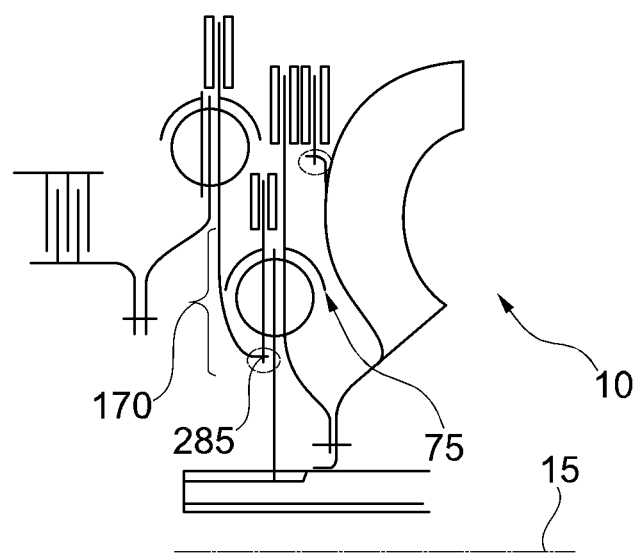

FIG. 13 shows a half longitudinal section through a torque transmitting device 10 according to a twelfth embodiment. The torque transmitting device 10 is of substantially identical design to the torque transmitting device 10 illustrated in FIG. 12. As a departure therefrom, the second plug connection 285 is arranged radially on the inside with respect to the second damper unit 75. As a result, the first coupling part 170 can be of longer design in the axial direction and can be designed with a shallower curvature than in FIG. 12.

Figure 14:
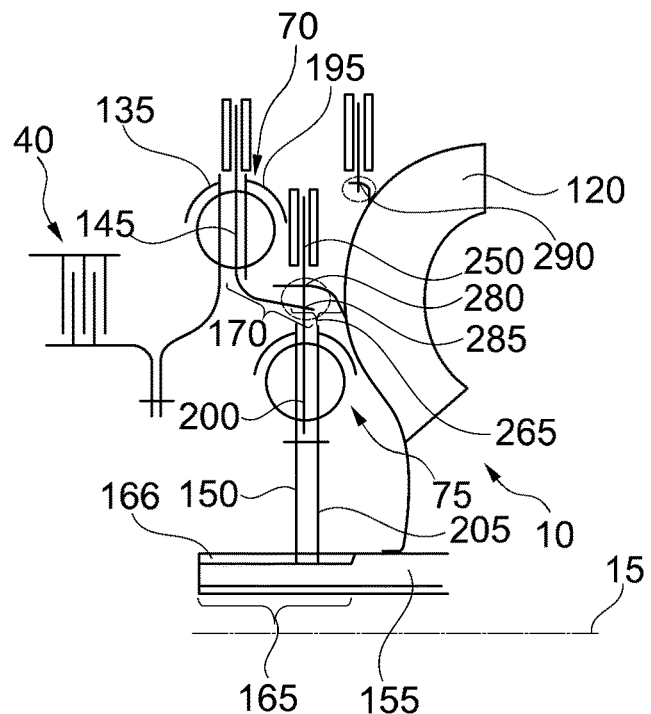

FIG. 14 shows a half longitudinal section through a torque transmitting device 10 according to a thirteenth embodiment. The torque transmitting device 10 is of substantially identical design to the torque transmitting device 10 illustrated in FIG. 12. As a departure therefrom, the first speed-dependent absorber 50 is dispensed with. Moreover, the first damper unit 70 has the first damper input part 135 and the second damper input part 195, wherein the first damper output part 145 is arranged axially between the first damper input part 135 and the second damper input part 195. The first damper input part 135 and the second damper input part 195 are connected to one another. The first coupling part 170 is connected to the third damper input part 200 or the fourth absorber flange 250 by means of the second plug connection 285. In this embodiment, the first coupling part 170 is here plugged into the fourth absorber flange 250 and/or the third damper input part 200 on the left, i.e. on a side facing the lockup clutch 40.

The second damper unit 75 has the second damper output part 150 and the third damper output part 205, wherein the second damper output part 150 and the third damper output part 205 are connected to one another, wherein the third damper input part 200 engages in the axial direction between the second damper output part 150 and the third damper output part 205. On the inside, both the second damper output part 150 and the third damper output part 205 engage in the first external tooth system 166 of the output shaft 155 in order to introduce the torque into the output shall 155.

The turbine wheel 120 is connected torsionally to the fourth absorber flange 250 and/or the third damper input part 200 by means of the second plug connection 285. Here, the engagement of the fourth coupling part 265 takes place on a side of the fourth absorber flange 250 which faces away from the first coupling part 170 and thus on a side facing the turbine wheel 120 or on a side facing away from the lockup clutch 40.

Figure 15:
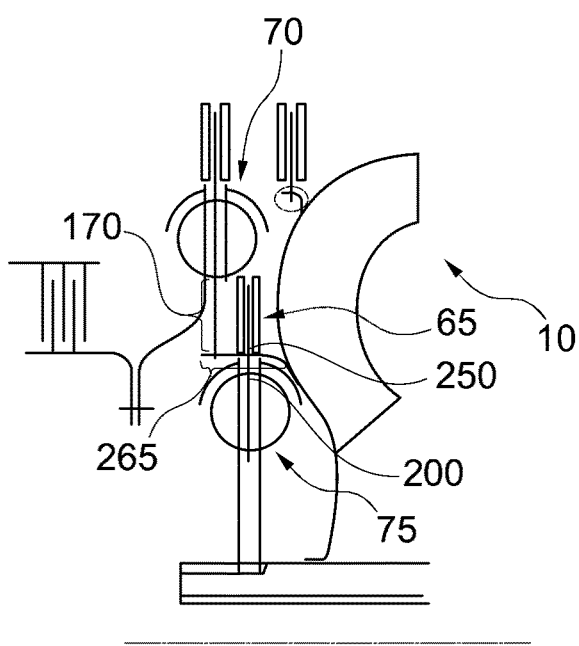

FIG. 15 shows a half longitudinal section through a torque transmitting device 10 according to a fourteenth embodiment. The torque transmitting device 10 is of substantially identical design to the configuration of the torque transmitting device 10 illustrated in FIG. 14. As a departure therefrom, the plug connections 280, 285, 290 are dispensed with. Furthermore, as compared with the configuration shown in FIG. 14, the fourth coupling part 265 is of longer design in the axial direction than is shown in FIG. 14. In this case, the fourth absorber flange 250 is secured radially on the outside and the third damper input part 200 is secured radially on the inside of the fourth coupling part 265.

The first coupling part 170 extends from radially on the outside in relation to the first damper unit 70 toward the radial inside and is connected to the fourth coupling part 265. Furthermore, the fourth speed-adaptive absorber 65 is arranged radially between the first damper unit 70 and the second damper unit 75.

Figure 16:
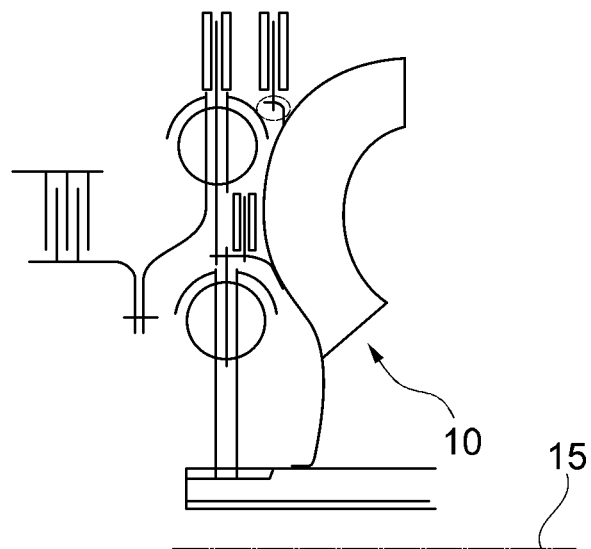

FIG. 16 shows a torque-transmitting device 10 in accordance with a fifteenth embodiment. The torque transmitting device 10 is substantially identical to the embodiment of the torque transmitting device 10 shown in FIG. 15. As a departure therefrom, however, the configuration of the torque transmitting device 10 shown in FIG. 16 is of narrower design in the axial direction than the torque transmitting device 10 shown in FIG. 15.

Figure 17:
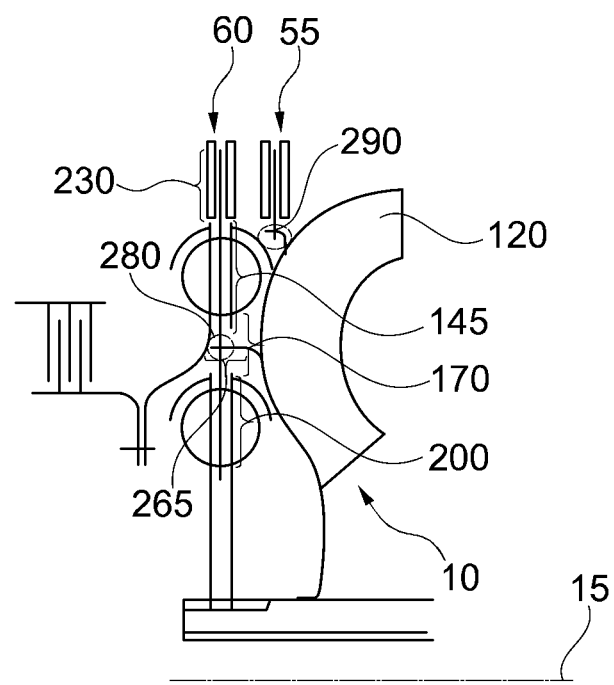

FIG. 17 shows a half longitudinal section through a torque transmitting device 10 according to a sixteenth embodiment. The torque transmitting device 10 is substantially a combination of the configuration of the torque transmitting device 10 illustrated in FIGS. 14 and 15. As a departure therefrom, the fourth speed-adaptive absorber 65 is dispensed with. Moreover, the first coupling part 170 is of disk-shaped design and is formed integrally and in a materially unitary manner both with the second absorber flange 230, the first damper output part 145, which, by way of example, is arranged radially on the inside with respect to the second absorber flange 230, and the third damper input part 200, which is arranged radially on the inside with respect to the first coupling part 170. The first coupling part 170 is connected to the fourth coupling part 265 by means of the first plug connection 280 and to the turbine wheel 120 via the fourth coupling part 265.

Figure 18:
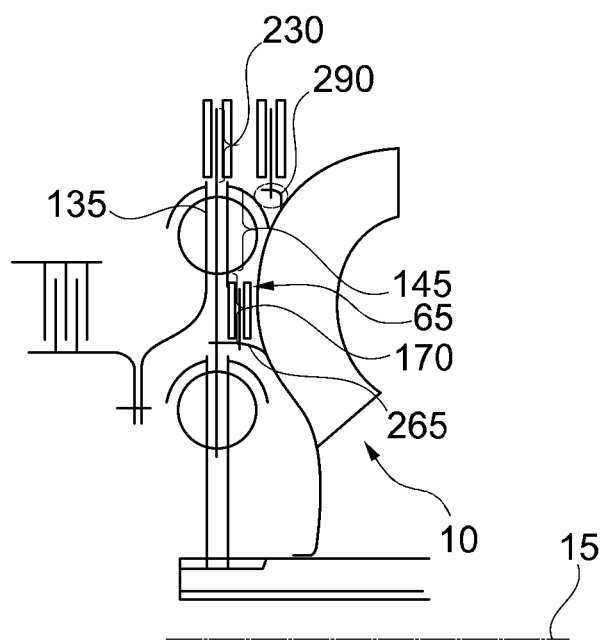

FIG. 18 shows a torque-transmitting device 10 in accordance with a seventeenth embodiment. The torque transmitting device 10 is substantially a combination of the torque transmitting device 10 shown in FIG. 15 and the torque transmitting device 10 shown in FIG. 17. Here, the configuration is substantially identical with the configuration shown in FIG. 15, but the integral and materially unitary configuration of the first coupling part 170, of the first damper output part 145 and of the third absorber flange 240 and of the third damper input part 200 has been integrated into the configuration shown in FIG. 15. Furthermore, in contrast to FIG. 17, the second plug connection 285 and the third plug connection 290 have been dispensed with. Moreover, the fourth speed-adaptive absorber 65 is arranged radially on the inside with respect to the second speed-adaptive absorber 55 and secured on the turbine wheel 120.

Figure 19:
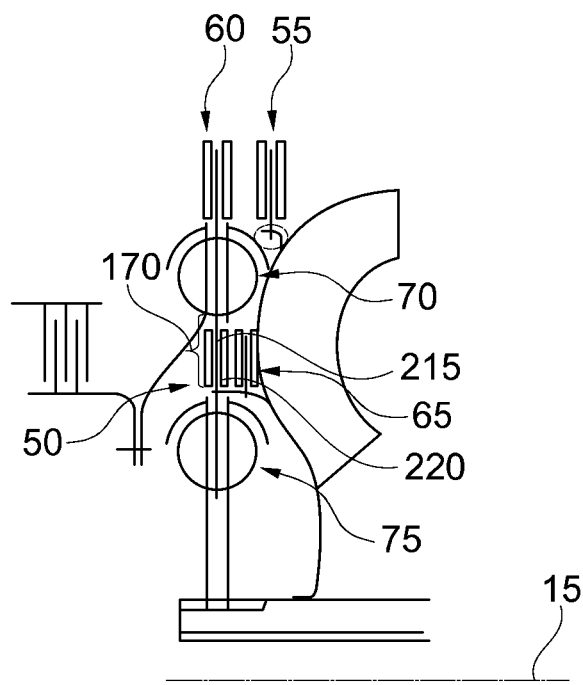

FIG. 19 shows a torque-transmitting device 10 in accordance with an eighteenth embodiment. The torque transmitting device 10 is of substantially identical design to the configuration shown in FIG. 18. In contrast to FIG. 18, as a departure therefrom, the first speed-adaptive absorber 50 is provided in addition, wherein the first absorber flange 215 and the first coupling part 170 coincide. That is to say that the first absorber mass 220 is secured on the first coupling part 170. As a result, the second speed-adaptive absorber 55 is arranged radially at the level of the fourth speed-adaptive absorber 65. Furthermore, the first speed-adaptive absorber 50 is arranged radially between the first damper unit 70 and the second damper unit 75. In the axial direction, the first speed-adaptive absorber 50, the third speed-adaptive absorber 60 and the first and second damper units 70 and 75 are arranged in axial overlap. Here, an axial overlap is taken to mean that, when at least two components, in this embodiment the first and third speed-adaptive absorbers 50, 60 and the first and second damper units 70, 75 by way of example, are projected into a projection plane in which the axis of rotation 15 is arranged, they overlap in the projection plane along a rotation plane relative to the axis of rotation 15.

Figure 20:
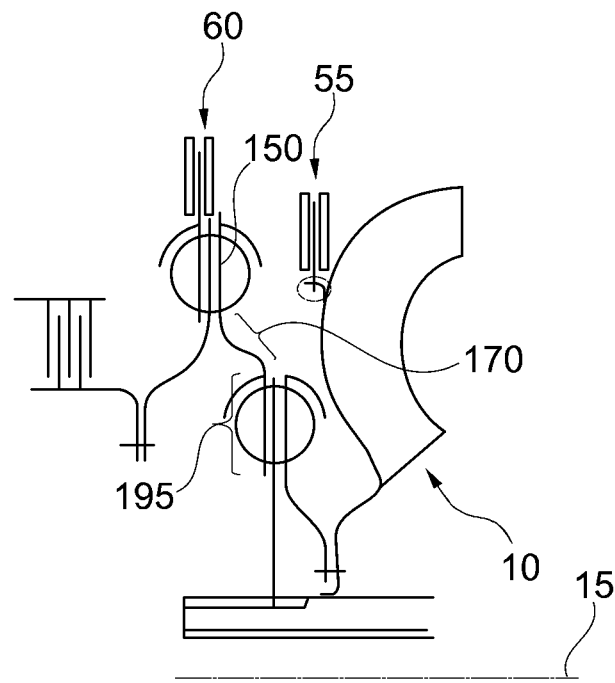

FIG. 20 shows a half longitudinal section through a torque transmitting device 10 according to a nineteenth embodiment. The torque transmitting device 10 is of substantially identical design to the configuration of the torque transmitting device 10 shown in FIG. 12. As a departure therefrom, the second damper output part 150, the first coupling part 170 and the second damper input part 195 are formed integrally and in a materially unitary manner, wherein the first coupling part 170 extends obliquely to the axis of rotation 15, whereas the second damper output part 150 and the second damper input part 195 extend in different rotation planes. Furthermore, the first speed-adaptive absorber 50 and the fourth speed-adaptive absorber 65 are dispensed with, and therefore the torque transmitting device 10 has only the second speed-adaptive absorber 55 and the third speed-adaptive absorber 60.

Figure 21:
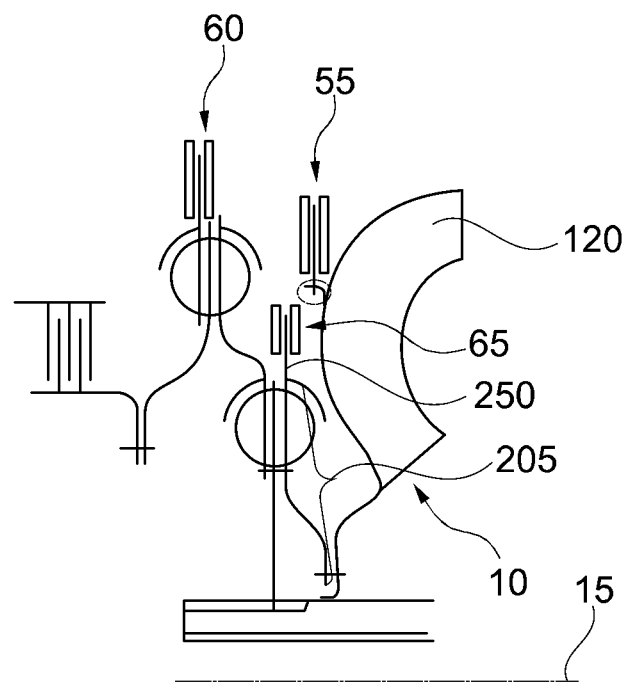

FIG. 21 shows a half longitudinal section through a torque transmitting device 10 according to a twentieth embodiment. The torque transmitting device 10 is of substantially identical design to that in FIG. 20. In addition, the fourth speed-adaptive absorber 65 is provided, wherein the fourth absorber flange 250 is connected radially on the inside to the third damper input part 200. In this embodiment, the fourth absorber flange 250 and the third damper input part 200 are formed integrally and in a materially unitary manner.

In the radial direction, the fourth speed-adaptive absorber 65 is furthermore arranged radially on the inside with respect to the second speed-adaptive absorber 55. The second speed-adaptive absorber 55 is arranged radially further in than the third speed-adaptive absorber 60. The fourth speed-adaptive absorber 65 is arranged between the second speed-adaptive absorber 55 and the third speed-adaptive absorber 60 in the axial direction. The turbine wheel 120 is connected radially on the inside to the third damper input part 200 (as in FIGS. 9, 10, 11, 12 and 13, for example).

Figure 22:
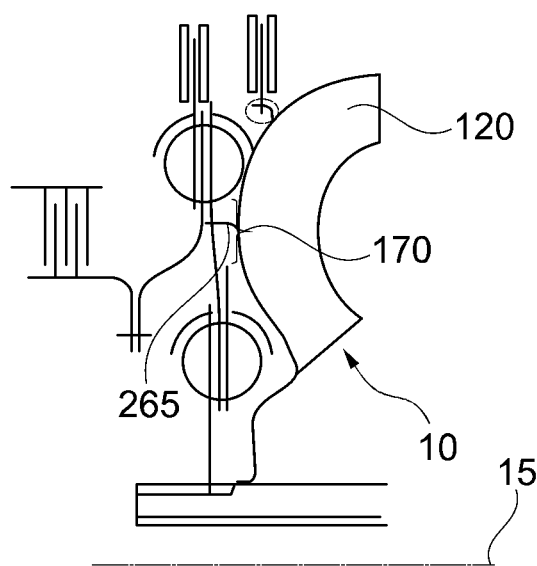

FIG. 22 shows a half longitudinal section through a torque transmitting device 10 according to a twenty-first embodiment.

The torque transmitting device 10 is of substantially identical design to the configuration of the torque transmitting device 10 shown in FIG. 21. As a departure therefrom, the fourth speed-adaptive absorber 65 is dispensed with. Furthermore, the first coupling part 170 is connected to the fourth coupling part 265. The turbine wheel 120 is thereby connected to the first coupling part 170 via the fourth coupling part 265. The arrangement of the connection of the first coupling part 170 to the fourth coupling part 265 corresponds substantially to the configuration illustrated in FIG. 17. Here, the second plug connection 285 can be provided as illustrated in FIG. 17. In FIG. 22, however, the second plug connection 285 is dispensed with, and therefore the first coupling part 170 is connected in a fixed manner to the fourth coupling part 265.

Figure 23:
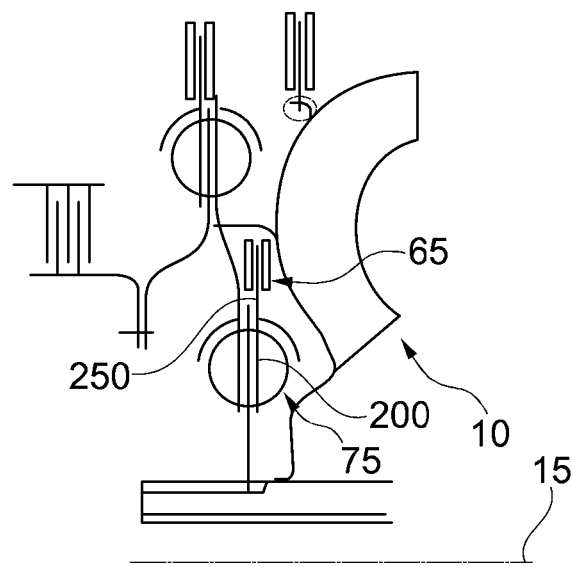

FIG. 23 shows a half longitudinal section through a torque transmitting device 10 according to a twenty-second embodiment. The torque transmitting device 10 is of substantially identical design to the configuration illustrated in FIG. 22. As a departure therefrom, the fourth speed-adaptive absorber 65 is provided, wherein the fourth absorber flange 250 is arranged radially on the outside with respect to the second damper unit 75 and is connected by a radially inner end to the third damper input part 200.

The configuration shown in FIGS. 1 to 23 ensures a modular construction of the torque transmitting device 10. In particular, it is thereby possible to provide a modular system in which, depending on the respective components to be combined, in particular the first to fourth speed-adaptive absorbers 50, 55, 60, 65 and the damper units 70, 75, these can be installed or omitted according to requirements. In this embodiment it is particularly advantageous if the first damper unit 70 is designed as a self-contained unit and thus independently of the second damper unit 75, thus ensuring that both damper units 70, 75 would also work as individual components, irrespective of whether they are provided in the torque transmitting device 10. The same also applies to the speed-adaptive absorbers 50, 55, 60, 65, 315 provided and to the turbine wheel 120. By virtue of the coupling of the turbine wheel 120 directly or indirectly, e.g. via the fourth coupling part 265, to the first coupling part 170, independently of the other components, the series damper 45 and/or the speed-adaptive first to fourth absorbers 50, 55, 60, 65 can be installed in different configurations of the torque transmitting device 10. Compensation in respect of geometrical dimensions is performed by means of the coupling unit 80. In particular, it is also possible here to dispense with the hydrodynamic converter 35.

Furthermore, wobbling movements of the components of the torque transmitting device 10 are reduced or even avoided by the configurations shown in FIGS. 1 to 23, particular by virtue of the constraining forces when the bracing means 295, 300 are provided. Furthermore, the tolerance requirements can be reduced, and therefore the production costs for the production of the torque transmitting device 10 are particularly low. Furthermore, efficient use is made of installation spaces.

LIST OF REFERENCE NUMBERS 10 torque transmitting device
15 axis of rotation 20 input side
25 output side
30 speed-increasing device
35 hydrodynamic converter
40 lockup clutch
45 series damper
50 first speed-adaptive absorber
55 second speed-adaptive absorber
60 third speed-adaptive absorber
65 fourth speed-adaptive absorber
70 first damper unit
75 second damper unit
80 coupling unit
85 first damper element
90 second damper element
95 first damper input side
100 first damper output side
105 second damper input side
110 second damper output side
115 pump impeller
120 turbine wheel
125 clutch input side
130 clutch output side
135 first damper input part
145 first damper output part
150 second damper output part
155 output shaft
160 first section
165 second section
166 first external tooth system
170 first coupling part
175 second coupling part
176 connecting hub
180 first internal tooth system
185 second internal tooth system
190 second external tooth system
195 second damper input part
200 third damper input part
205 third damper output part
210 third internal tooth system
215 first absorber flange
220 first absorber mass
225 fourth internal tooth system
230 second absorber flange
235 second absorber mass
240 third absorber flange
245 third absorber mass
250 fourth absorber flange
255 fourth absorber mass
260 third coupling part
265 fourth coupling part
270 fifth internal tooth system
275 sixth internal tooth system
280 first plug connection
285 second plug connection
290 third plug connection
295 first bracing means
300 second bracing means
305 supporting element
310 seventh internal tooth system
311 turbine flange
315 fifth speed-adaptive absorber
320 fifth absorber flange
325 fifth absorber mass

The invention claimed is:

1. A torque transmitting device, which can be rotatably mounted about an axis of rotation, comprising:
a series damper having a first damper unit, a second damper unit and a coupling unit,
wherein the first damper unit has a first damper element coupled to a damper output side and the second damper unit has a second damper element coupled to a damper input side,
wherein the coupling unit is arranged between the damper output side of the first damper unit and the damper input side of the second damper unit,
wherein the coupling unit has a first coupling part and a second coupling part,
wherein the first coupling part and the second coupling part are arranged axially offset in relation to one another,
wherein the first coupling part connects the damper output side of the first damper unit to the second coupling part,
wherein the second coupling part connects the first coupling part to the damper input side of the second damper unit,
wherein the coupling unit has a connecting hub arranged radially interior to the first and second damping elements,
wherein the connecting hub is arranged to be rotatably mounted on an output shaft, the output shaft extending radially interior to the first and second damper units,
wherein the connecting hub has an external tooth system on a circumference,
wherein the first coupling part has an internal tooth system and the second coupling part has a further internal tooth system,
wherein the internal tooth system of the first coupling part and the further internal tooth system of the second coupling part engage in the external tooth system.

2. The torque transmitting device as claimed in claim 1, further comprising:
a bracing means,
wherein the bracing means is arranged between the first coupling part and a support element,
wherein the bracing means is designed to brace the first coupling part against the support element in at least one of an axial direction or in a circumferential direction.

3. The torque transmitting device as claimed in claim 1, wherein the second damper unit includes a damper output side connected to the output shaft, the damper output side of the second damper unit being axially spaced from the connecting hub.

4. The torque transmitting device as claimed in claim 3, wherein:
the output shaft includes a further external tooth system; and
the damper output side of the second damper unit includes a third internal tooth system,
the third internal tooth system engaging the further external tooth system.

5. The torque transmitting device as claimed in claim 1, further comprising a speed-adaptive absorber having a flange, the flange being arranged axially between the first coupling part and the second coupling part.

6. The torque transmitting device as claimed in claim 5, wherein the flange includes a third internal tooth system engaged with the external tooth system of the connecting hub.

7. The torque transmitting device as claimed in claim 5, wherein the speed-adaptive absorber is arranged in axial overlap with at least one of the first damper unit or the second damper unit.

8. The torque transmitting device as claimed in claim 5, wherein the speed-adaptive absorber is arranged radially between the first damper unit and the second damper unit.

9. The torque transmitting device as claimed in claim 1, further comprising a turbine wheel connected torsionally to the coupling unit via a further coupling part, the further coupling part arranged axially between the first coupling part and the second coupling part.

10. The torque transmitting device as claimed in claim 9, wherein the further coupling part includes a third internal tooth system engaged with the external tooth system of the connecting hub.

11. A torque transmitting device, which can be rotatably mounted about an axis of rotation, comprising:
- a turbine wheel of a hydrodynamic converter and a series damper having a first damper unit, a second damper unit and a coupling unit, the coupling unit including a connecting hub arranged to be rotatably mounted on an output shaft,
- wherein the output shaft extends radially interior to the first and second damper units,
- wherein the coupling unit connects the first damper unit torsionally to the second damper unit,
- wherein the turbine wheel is connected torsionally to the coupling unit, and
- at least one speed-adaptive absorber,
- wherein the speed-adaptive absorber has at least one absorber flange,
- wherein the absorber flange is connected torsionally to the coupling unit or is formed integrally and in a materially unitary manner with the coupling unit,
- wherein the absorber flange has an internal tooth system,
- wherein the absorber flange is arranged axially between the first coupling part and the second coupling part,
- wherein the internal tooth system engages in an external tooth system on a circumference of the connecting hub and connects the absorber flange torsionally to the connecting hub.

12. The torque transmitting device as claimed in claim 11, wherein the speed-adaptive absorber is arranged radially between the first damper unit and the second damper unit.

13. The torque transmitting device as claimed in claim 11, further comprising a bracing means designed to brace one of the first or second coupling parts against a support element in at least one of an axial direction or in a circumferential direction,
- wherein the first damper unit has a first damper element having a first stiffness, and the second damper unit has a second damper element having a second stiffness,
- wherein the bracing means has a third stiffness,
- wherein the third stiffness is greater than at least one of the first stiffness or the second stiffness.

14. The torque transmitting device as claimed in claim 11, wherein the coupling unit has a further coupling part, wherein the further coupling part is connected on one side to the turbine wheel and on the other side is connected to the first coupling part and the second coupling part.

15. The torque transmitting device as claimed in claim 14, having a further speed-adaptive absorber having a further absorber flange,
- wherein the further coupling part extends substantially in an axial direction,
- wherein the further absorber flange extends substantially in a radial direction and is connected radially on the inside or radially on the outside to the further coupling part by a connection that can be plug-fitted in the axial direction.

16. The torque transmitting device as claimed in claim 14, wherein the further coupling part is connected by a positive connection that can be plug-fitted in an axial direction to at least one of the first coupling part or the second coupling part.

17. The torque transmitting device as claimed in claim 11, wherein the at least one speed-adaptive absorber is a centrifugal pendulum.

18. The torque transmitting device as claimed in claim 11, wherein the at least one speed-adaptive absorber is arranged in axial overlap with at least one of the first damper unit or the second damper unit.

19. The torque transmitting device as claimed in claim 14, wherein the further coupling part is arranged axially between the first coupling part and the second coupling part.

20. The torque transmitting device as claimed in claim 14, wherein the further coupling part includes a further internal tooth system, the further internal tooth system engaging the external tooth system of the connecting hub.

* * * * *